(12) United States Patent  
Shigeno et al.

(10) Patent No.: US 7,933,477 B2
(45) Date of Patent: Apr. 26, 2011

(54) OPTICAL TRANSMISSION HINGE APPARATUS

(75) Inventors: Yasuhiro Shigeno, Yao (JP); Hiroshi Nakagawa, Yao (JP); Takeshi Isoda, Yao (JP); Kosuke Sasada, Yao (JP)

(73) Assignee: Hosiden Corporation, Osaka (JP)

( * ) Notice: Subject to any disclaimer, the term of this patent is extended or adjusted under 35 U.S.C. 154(b) by 0 days.

(21) Appl. No.: 12/400,179

(22) Filed: Mar. 9, 2009

(65) Prior Publication Data

US 2009/0232459 A1 Sep. 17, 2009

(30) Foreign Application Priority Data

Mar. 13, 2008 (JP) .................................. 2008-064459

(51) Int. Cl.
*G05B 6/26* (2006.01)
*G05B 6/42* (2006.01)
*H04M 1/00* (2006.01)

(52) U.S. Cl. ....................... 385/25; 455/575.3
(58) Field of Classification Search ..................... 385/25, 385/33; 455/575.3
See application file for complete search history.

(56) References Cited

U.S. PATENT DOCUMENTS

| 7,338,193 B1 * | 3/2008 | Zeiger et al. | 362/551 |
| 7,374,424 B1 | 5/2008 | Nurmi et al. | |
| 2004/0223689 A1 | 11/2004 | Lempkowski et al. | |
| 2007/0032275 A1 * | 2/2007 | Suzuki et al. | 455/575.3 |
| 2008/0170356 A1 | 7/2008 | Alameh et al. | |

FOREIGN PATENT DOCUMENTS

| JP | 2005252334 A | 9/2005 |
| JP | 2007274057 A | 10/2007 |
| JP | 2007305448 A | 11/2007 |
| WO | 2007018763 A1 | 2/2007 |
| WO | 2008072064 A2 | 6/2008 |
| WO | 2008088657 A1 | 7/2008 |

* cited by examiner

*Primary Examiner* — Mark A Robinson
*Assistant Examiner* — Erin D Chiem
(74) *Attorney, Agent, or Firm* — The Webb Law Firm

(57) ABSTRACT

An optical transmission hinge apparatus includes a first hinge portion for pivotally interconnecting a first casing and a second casing about a first axis, a first optical device provided in the first casing, a second optical device provided in the second casing and an optical guide path member for interconnecting the first optical device and the second optical device to enable optical transmission therebetween. The optical guide path member includes a bent portion, a first portion formed on one side of the bent portion and a second portion formed on the other side of the bent portion. The first portion is provided in the first casing to be coaxial with the first hinge portion, with a terminal end of the first portion being in opposition to the first optical device. The second portion is provided in the second casing, with a terminal end of the second portion being in opposition to the second optical device.

4 Claims, 6 Drawing Sheets

OPTICAL TRANSMISSION HINGE APPARATUS

BACKGROUND OF THE INVENTION

1. Field of the Invention

The present invention relates to an optical transmission hinge apparatus for use in a foldable portable device such as a foldable mobile phone, a laptop computer, for effecting data communication by transmission/reception of light between two casings configured to be pivotable relative to each other about at least one hinge.

2. Description of the Related Art

Japanese Patent Application "Kokai" No. 2007-274057 discloses a portable wireless terminal device comprising a biaxial hinge arrangement which allow two casings respectively having a display section and a control section to be pivotally foldable about an opening/closing axis and which also allow the two casings to be pivotable also about a vertical pivot axis extending normal to the opening/closing axis. In this terminal device, optical communication devices are provided respectively in the two casings, i.e. the display section side casing and the control section side casing, to enable optical communication even when the two casings are displaced relative to each other. Further, optical path space is formed along the opening/closing axis and the vertical pivot center axis and a mirror is provided at the intersection point between the opening/closing axis and the vertical pivot center axis.

With the above-described art, light irradiated from one optical communication device travels through the space acting as the optical path and then is reflected by the mirror disposed at the intersection between the opening/closing axis and the vertical pivot center axis and enters the other optical communication device. In this construction, the relative positional relationship between the mirror and the optical communication devices is very important, so high precision is required for the assembly.

Further, as space is needed as an optical path, there is the risk of this optical path being easily blocked by an inadvertent movement of an adjacent disposed electric cable, entrance of dust, etc., thus hindering the communication. Moreover, if there occurs deformation in the casing(s), this deformation directly results in deformation of the optical path. So, the space acting as an optical path needs to have some "margin" to allow for such deformation. This requirement would make it difficult to form the casing(s) compact.

In view of the above-described state of the art, the primary object of the present invention is to provide an optical transmission hinge apparatus capable of maintaining optical communication even when its casings are pivotally moved relative to each other.

SUMMARY OF THE INVENTION

According to a first characterizing feature of an optical transmission hinge apparatus of the present invention, the apparatus comprises:

a first hinge portion for pivotally interconnecting a first casing and a second casing about a first axis;

a first optical device provided in said first casing;

a second optical device provided in said second casing; and an optical guide path member for interconnecting said first optical device and said second optical device to enable optical transmission therebetween;

wherein said optical guide path member includes a bent portion, a first portion formed on one side of said bent portion and a second portion formed on the other side of said bent portion, said first portion is provided in said first casing to be coaxial with said first hinge portion, with a terminal end of the first portion being in opposition to the first optical device, and said second portion is provided in said second casing, with a terminal end of the second portion being in opposition to the second optical device.

With the above-described construction, there is provided the optical guide path member (i.e. a solid body rather than a space) as an optical "path" for enabling optical transmission between the first optical device included in the first casing and the second optical device included in the second casing. Hence, light from the first optical device can travel through the interior of this optical guide path member to reach the second optical device. Therefore, the optical transmission between the first optical device and the second optical device can be effected in a reliable manner.

Also, there is no possibility of some element or substance such as a cable, or dust or the like introduced into the apparatus interfering with the path for optical transmission, so that optical communication can be effected in a reliable manner. Moreover, as the path for the optical communication is provided as an independent solid component, there is provided freedom of choice in choosing the disposing position of electrical cable. Therefore, the optical guide path member and the cable can be arranged so as not to be interfered with each other As a result, there will hardly occur such inconvenience of cutting accident of the cable and the construction also allows for a larger pivotal angle between the two casings.

Further, with the above-described construction, the first casing and the second casing are interconnected via the first hinge portion pivotable about the first axis and the optical guide path member interconnects the first optical device provided in the first casing and the second optical device provided in the second casing so that these devices can optically communicate with each other. Therefore, although the two casings are pivotable relative to each other via the first hinge portion, the optical communication between the two casings can be effected reliably.

Moreover, the first portion formed on one side of the bent portion is provided in the first casing to be coaxial with the first hinge portion and the terminal end of the first portion is in opposition to the first optical device. whereas, the second portion formed on the other side of the bent portion is provided in the second casing, and the terminal end of the second portion is in opposition to the second optical device. Accordingly, when the two casings are pivotally operated about the first axis through the first hinge portion, the optical guide path member is pivoted about the first axis to follow the pivotal relative movement of the two casings. Therefore, there occurs no twisting of the optical guide path member in association with the pivotal movement of the two casings. As a result, damage to the optical guide path member can be restricted and stable optical communication can be maintained.

According to a second characterizing feature of the optical transmission hinge apparatus of the invention, said bent portion includes a reflecting portion configured to switch over the optical path between said first optical device and said second optical device.

If the bent portion includes a reflecting portion configured to switch over the optical path between the first optical device and the second optical device as the above-described second characterizing feature of the invention, light from the first optical device can reliably be reflected toward the second optical device, only by fixing in position the respective terminal ends of the first portion and the second portion in opposition to the first optical device and the second optical device. In this way, the optical path can be determined distinctly, so that the optical transmission between the two optical devices can be carried out reliably.

According to a third characterizing feature of the optical transmission hinge apparatus of the present invention, the apparatus further comprises a second hinge portion for interconnecting said first casing and said second casing to be pivotable about a second axis which extends normal to said first axis and which extends about an incident direction of light to said second optical device; and wherein a member provided in said first casing and pivotable about said first axis relative to said first casing pivotally supports a member which is provided in said second hinge portion and to which said second casing is attached, with the latter member being pivotal about said second axis.

With the above-described construction, the two casings are pivotable not only about the first axis, but also about the second axis. So, the two casings can be operated into various postures as desired. Further, as the second axis is in alignment with the center axis of the light incident to the second optical device, i.e. the center axis of the optical guide path member, there occurs no change in the relative positions between the first optical device, the second optical device and the optical guide path member. Therefore, stable optical transmission can be maintained and also damage to the optical guide path member in association with the pivotal movements of the casings can be restricted.

According to a fourth characterizing feature of the optical transmission hinge apparatus of the present invention, said first hinge portion includes an attaching portion for holding said optical guide path member and said second hinge portion includes an attaching portion for holding said optical guide path member; at least one of said attaching portions being configured to allow insertion of said optical guide path member and hold this inserted optical guide path member therein; and between the inserted portion of said optical guide path member and said attaching portion holding the inserted portion, there is formed a gap extending along an axial direction of said inserted portion.

With the above-described construction, when a cable member such as an electric power cable is inserted to the gap, the relative positional relationship between the position-fixed portion of the cable member and the optical guide path member can be fixed. As a result, the cable member can be laid out in a neat and organized manner, and also intertwining between the cable member and the optical guide path member can be avoided.

According to a fifth characterizing feature of the optical transmission hinge apparatus of the present invention, said first hinge portion includes an attaching portion for holding said optical guide path member and said second hinge portion includes an attaching portion for holding said optical guide path member; at least one of said attaching portions is configured to allow insertion of said optical guide path member and hold this inserted optical guide path member therein; and at least one of the inserted portion of said optical guide path member and said attaching portion holding the inserted portion, includes a through hole extending along an axial direction of said inserted portion.

With the above-described construction, when a cable member such as an electric power cable is inserted to the through hole, the relative positional relationship between the position-fixed portion of the cable member and the optical guide path member can be fixed. As a result, the cable member can be laid out in a neat and organized manner, and also intertwining between the cable member and the optical guide path member can be avoided.

Further and other features and advantages of the present invention will become apparent upon reading the following detailed description of the preferred embodiments thereof with reference to the accompanying drawings.

DETAILED DESCRIPTION OF THE PREFERRED EMBODIMENTS

First Embodiment

Next, an embodiment of an optical transmission hinge apparatus relating to the present invention will be described with reference to the accompanying drawings.

[General Description]

The optical transmission hinge apparatus of the invention is for use mainly in a foldable portable device such as a portable mobile phone, a laptop personal computer, etc to allow optical communication between circuit boards provided respectively in a plurality of casings of the device via a hinge which pivotally interconnects a plurality of casings of the device.

[Main Body of Mobile Phone]

Figure 1:
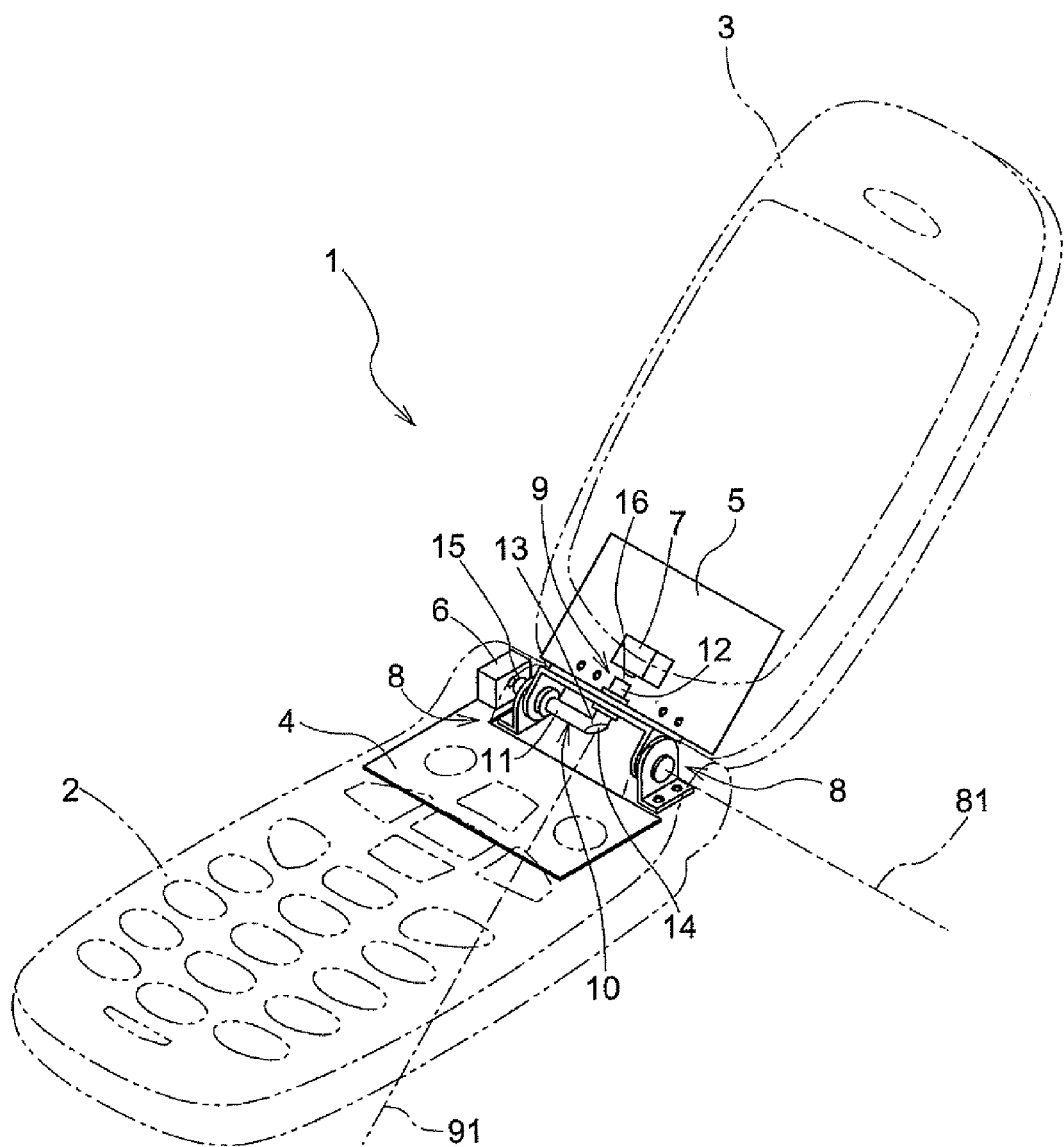
FIG. 1 an overall perspective view of a portable mobile phone having an optical transmission hinge apparatus according to a first embodiment of the present invention, FIG. 2 a perspective view of the optical transmission hinge apparatus, FIG. 3 a diagram of the optical transmission hinge apparatus, FIG. 4 perspective views respectively illustrating pivotal operations of the portable mobile phone having the optical transmission hinge apparatus, with (a) showing a condition when the mobile phone is pivoted for 180 degrees about a first axis, (b) showing a condition where the phone is pivoted for additional 45 degrees from the condition of (a) about the first axis, (c) showing a condition when the phone is pivoted from the condition of (b) for 45 degrees about a second axis FIG. 5 perspective views of an optical transmission path member relating to a second embodiment, with (a) showing a condition where a plurality of L-shaped optical guide path members are connected with each other, (b) being a perspective view showing a condition where a ring member is additionally provided for the optical guide path members under the condition of (a), FIG. 6 a perspective vie showing an optical guide path member relating to a third embodiment, FIG. 7 a perspective view showing an optical transmission hinge apparatus according to the third embodiment, FIG. 8 a plan view showing periphery of a second pivot plate relating to a fourth embodiment, FIG. 9 a perspective view showing an optical guide path member relating to a fifth embodiment, FIG. 10 a plan view showing periphery of a second pivot plate relating to the fifth embodiment, and FIG. 11 a plan view showing periphery of a second pivot plate relating to a sixth embodiment.
Figure 2:
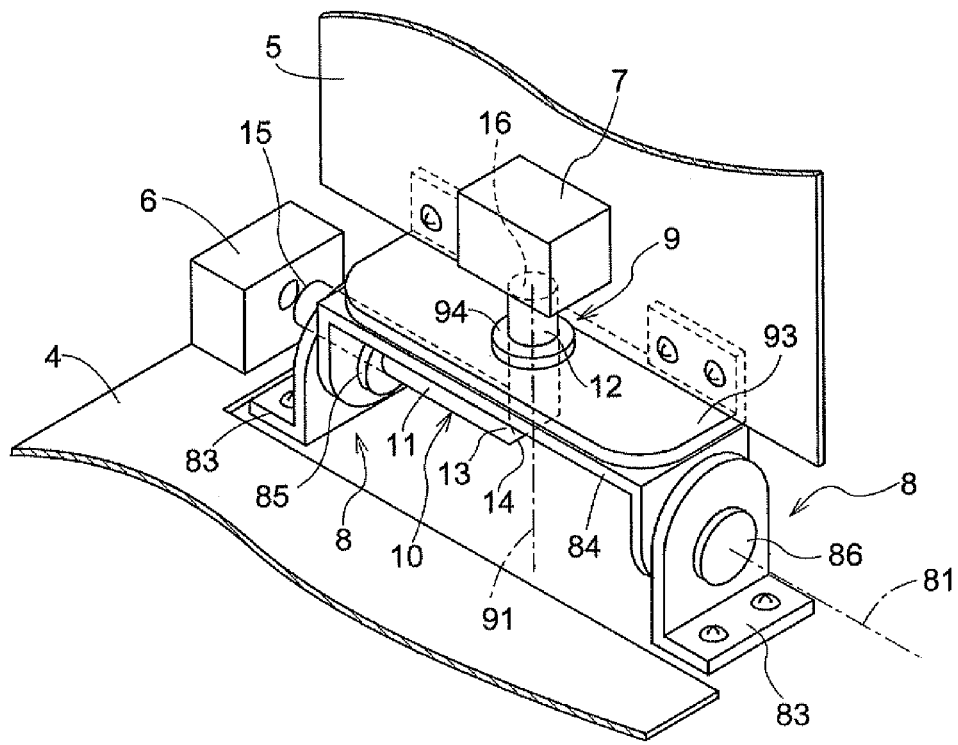

As an exemplary application of the inventive apparatus, there is shown a foldable mobile phone. The main body 1 of the mobile phone, as shown in FIGS. 1-3, includes a first casing 2 incorporating therein a transmission side circuit board 4 which mounts a first optical device 6, a second casing 3 incorporating a reception side circuit board 5 which mounts a second optical device 7, a hinge mechanism for pivotally interconnecting the first casing 2 and the second casing 3 and an optical guide path member 10 acting as a transmission path for optical signals

[Optical Guide Path Member]

Figure 3:
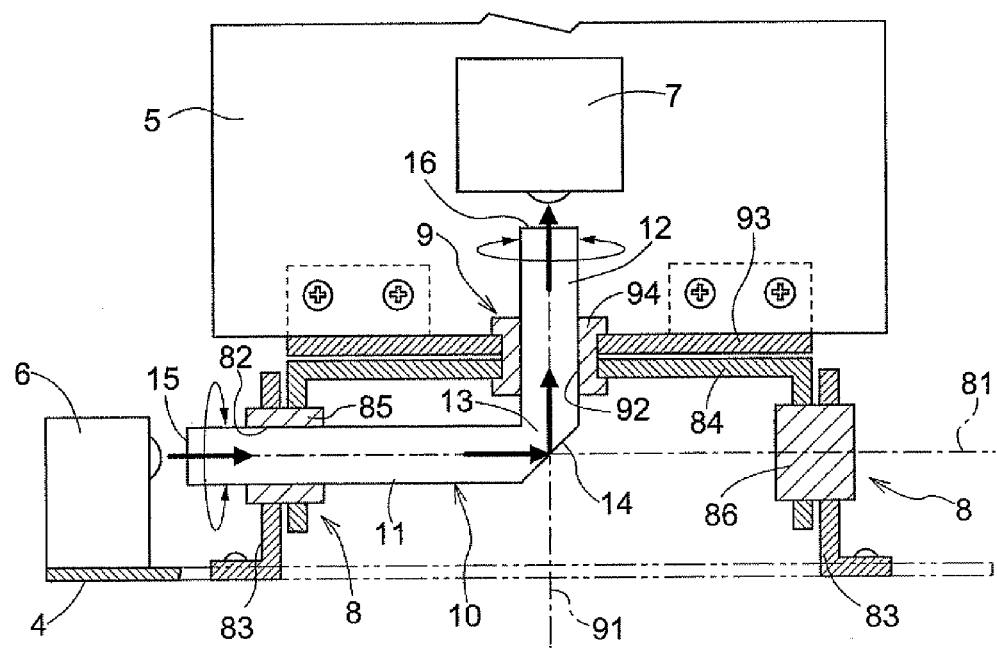

As shown in FIG. 3, the optical guide path member 10 has an L-shape and includes a first portion 11, a second portion 12, and a bent portion 13. The first portion 11 and the second portion 12 extend normal to each other and the bent portion 13 includes a reflecting portion 14. The optical guide path member 10 is disposed such that one terminal end 15 thereof on the side of the first portion 11 is in opposition to the first optical device 6 and the other terminal end 16 thereof on the side of the second portion 12 is in opposition to the second optical member 7.

The reflecting portion 14 is configured to reflect optical signal from the first optical device 6 solely toward the second optical device 7. To this end, as described above, the terminal end 15 of the first portion 11 is placed in opposition to the first optical device 6 and the terminal end 16 of the second portion 12 is placed in opposition to the second optical device 7, thus achieving reliable optical communication.

The optical guide path member 10 can be formed of any material that has both a high transmission factor and a high refraction index, relative to the particular wavelength of the light to be transmitted. Some non-limiting examples thereof include glass, polymers such as acrylic resin, etc. If, this optical guide path member 10 is formed of an optical fiber, this can decrease restrictions respecting the bent portion, thus providing wider scope of applications.

With the use of optical transmission utilizing an optical guide path member as above, even if other component such as a cable (not shown) from an electric power source or foreign substance such as dust should enter the inside of the device, such component or substance will cause no interference with the path used for optical transmission. As a result, optical communication can be effected reliably. Further, as the path of optical transmission is provided independently, freedom of choice is provided in disposing positions of the cable. Therefore, neat and well-organized arrangement is made possible which effectively avoids interference between the optical guide path member 10 and the cable. Consequently, there hardly occurs such inconvenience as cutting damage of the cable, and the construction allows for a greater pivot angle between the two casings 2, 3 also.

When an input operation is effected by an unillustrated control key, an electric signal based on this input operation is converted into an optical signal by the transmissions side circuit board 4 and this signal is irradiated from the first optical device 6 toward its terminal end 15. Then, the optical signal irradiated from the first optical device 6 enters, from the terminal end 15 of the first portion 11, the inside of the optical guide path member 10 and then exits the terminal end 16 and enters the second optical device 7. This optical signal which has entered the second optical device 7 is converted into an electric signal through the reception side circuit board 5 and based on this electric signal, display contents on the display section are changed into display contents corresponding to the input operation.

In reverse to the above-described procedure, signals corresponding to display contents may be transmitted from the second casing 3 side to the first casing 2 side. In that case, the optical signals travel in the reverse route to that of the above-described procedure.

Light emitting devices employed as the first optical device 6 and the second optical device 7 can be LED, surface emitting laser (VCSEL: Vertical Cavity Surface Emitting Laser), whereas the light receiving devices can be photodiodes, etc.

According to the above-described construction, the optical communication between the first optical device 6 and the second optical device 7 can be effected reliably through the optical guide path member 10, without being affected by pivotal operations of the two casings 2, 3 by the first hinge portion 8 and the second hinge portion 9.

[First Hinge Portion and Second Hinge Portion]

The first hinge portion 8 pivotally interconnects the two casings 2, 3 about a first axis 81. The second hinge portion 9 pivotally interconnects the two casings 2, 3 about a second axis 91. The first hinge portion 8 and the second hinge portion 9 are arranged and connected to each other such that the first axis 81 and the second axis 91 intersect perpendicularly to each other.

The first hinge portion 8 includes a pair of leg portions 83 fixed in juxtaposition to the first casing 2 along the first axis 81, an angular C-shaped first pivot plate 84 provided between the pair of leg portions 83, and a first hinge ring 85 and a second hinge ring 86 which pivotally interconnect the leg portions 83 and the first pivot plate 84 about the first axis 81. The leg portion 83 and the lateral face of the pivot plate 84 define holes having an inner diameter slightly larger than the outer diameter of the first hinge ring 85. The first hinge ring 85 is inserted into these holes and is pivotally secured to the leg portion 83 and the first pivot plate 84. The second hinge ring 86 is constructed similarly. Accordingly, the first pivot plate 84 is pivotable relative to the first casing 2 about the first axis 81.

The first hinge ring 85 defines an annular first through hole 82 about the first axis 81. In this first through hole 82, there is inserted and fixed a first portion 11, and the optical guide path member 10 is fixed to the first hinge portion 8. That is to say, the axis of the first portion 11 is in agreement or alignment with the first axis 81.

The second hinge portion 9 includes a second pivot plate 93 to which the second casing 3 is attached and a third hinge ring 94 which pivotally interconnects the first pivot plate 84 and the second pivot plate 93 about the second axis 93. The first pivot plate 84 and the second pivot plate 93 define holes having an inner diameter slightly larger than the outer diameter of the third hinge ring 94. The third hinge ring 94 is inserted into these holes and is fixed to be pivotable relative to the first pivot plate 84 and the second pivot plate 93.

The third hinge ring 94 defines an annular second through hole 92 about the second axis 91. In this second through hole 92, there is inserted and fixed a second portion 12, and the optical guide path member 10 is held to the second hinge portion 9. That is to say, the axis of the second portion 12 is in agreement or alignment with the second axis 91.

With the above-described construction, when the first casing 2 and the second casing 3 are pivotally opened/closed about the first axis 81, pivotal movements occur between the first hinge ring 85, the second hinge ring 86 and the respective leg portions 83, so that there occurs no twisting in the optical guide path member 10. Also, when the first casing 2 and the second casing 3 are pivoted about the second axis 91, a pivotal movement occurs between the third hinge ring 94 and the second pivot plate 93, so that there occurs no twisting in the optical guide path member 10 in this case either.

Figure 4:
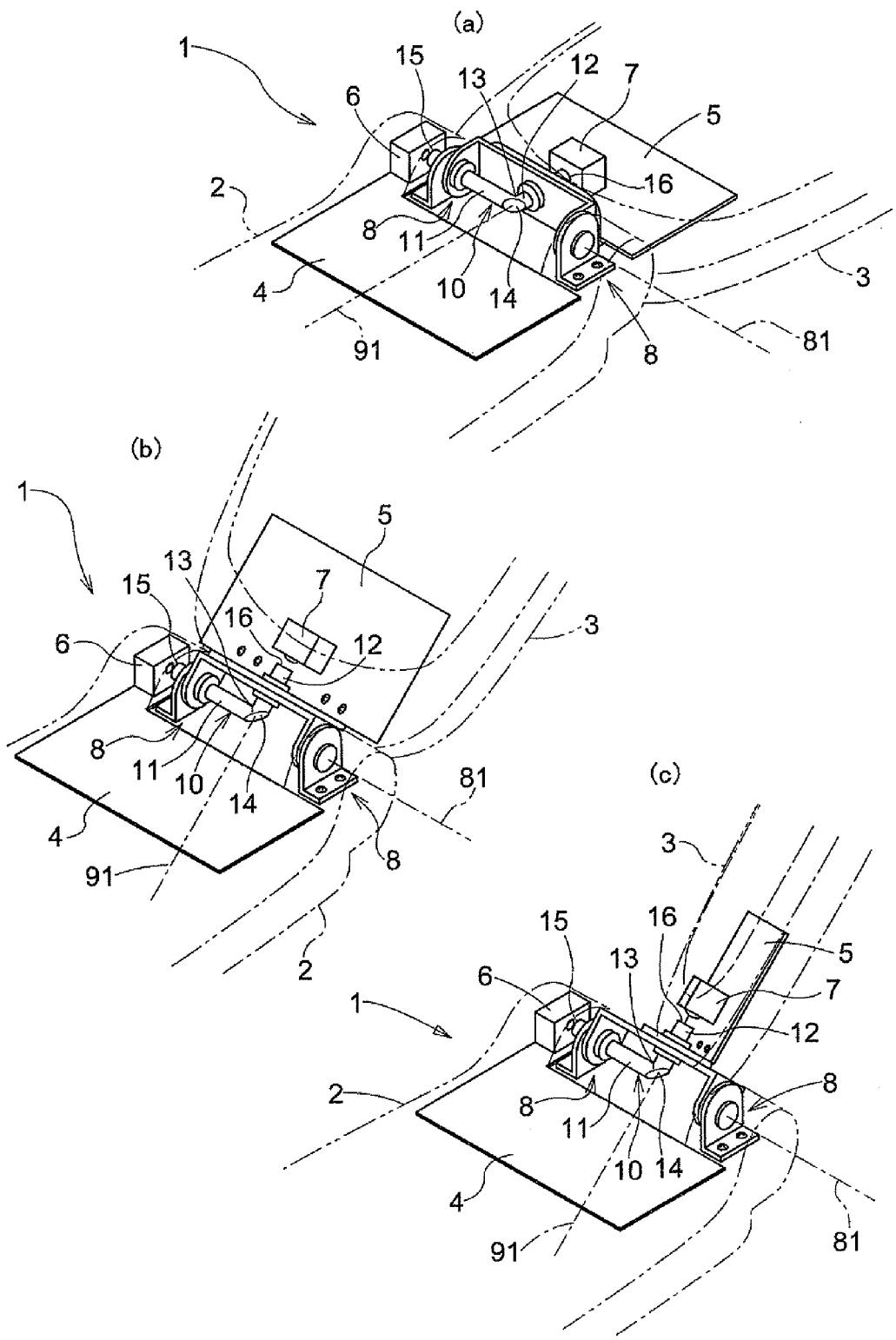

More particularly, as shown in FIG. 4(a) and (b), when the two casings 2, 3 are pivotally operated about the first axis 81,, this does not cause any change in the relative positional relationship between the first optical device 6 and the terminal end 15. Needless to say, no change occurs in the relative positional relationship between the second optical device 7 and the terminal end 16, either. Also, as shown in FIG. 4(b) and (c), when the two casings 2, 3 are pivotally operated about the second axis 91 via the second hinge portion 9, in addition to the pivotal operation thereof about the first axis 81, there occurs no change in the relative positional relationship between the second optical device 7 and the terminal end 16. Therefore, the construction ensures constantly stable optical communication and restricts damage to the optical guide path member 10 in association with pivotal operations of the casings 2. 3.

The pivotal operation about the first axis 91 and the pivotal operation about the second axis 91 do not interfere with each other as long as no interference occurs between the first casing 2 and the second casing 3. Certain design consideration will be needed to avoid such interference between the two casings. However, as such design consideration will be obvious for those skilled in the art, the discussion thereof is omitted herein.

Second Embodiment

Figure 5:
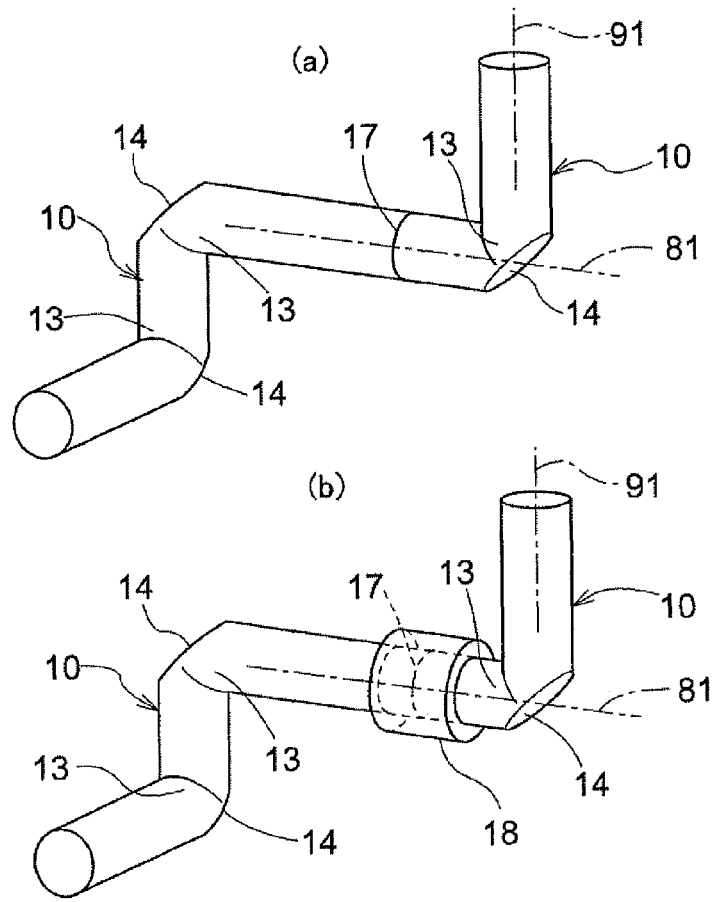

The shape of the optical guide path member 10 is not limited to the one described in the foregoing embodiment. The sole requirement for this optical guide path member 10 is that the terminal ends 15, 16 thereof be in opposition to the first optical device 6 and the second optical device 7, respectively. Hence, if desired, the optical guide path member 10 could include more than one bent portions 13. However, with increased number of bent portions 13, this could lead to greater difficulty in the inserting operation of the first portion 11 of the optical guide path member 10 to the first through hole 82 and/or the inserting operation of the second portion 12 to the second through hole 92 or greater difficulty in the manufacture of this optical guide path member 10 per se. For this reason, as shown in FIG. 5(a), it may be advantageous to employ a pair of L-shaped optical guide path members 10 connected with each other, with each guide member 10 having one bent portion 13 only. In this case, in order to restrict light amount loss which tends to occur at the connected portion 17, refraction index matching oil may be charged. And, in order to prevent displacement between the two optical guide path members 10 at the connected portion 17, as shown in FIG. 5(b), an annular guide member 18 can be provided and the two optical guide path members 10 can be inserted and fixed into the opposed ends of this guide member 18.

With the above-described construction, there is obtained an optical transmission hinge apparatus capable of providing constantly reliable optical communication in an electronic apparatus having a plurality of casings pivotable relative to each other, such as a mobile phone, a laptop personal computer, a PDA (Personal Digital Assistance), a computerized personal organizer, an electronic dictionary, a digital video camera, etc.

Third Embodiment

As a still further embodiment of the optical transmission hinge apparatus relating to the present invention, there will be described an apparatus wherein a gap acting as a cable layout path for cable is provided in the second hinge portion. In the following discussion, description of the parts thereof identical to the foregoing embodiment will be omitted and denoted with the same reference numerals.

Figure 6:
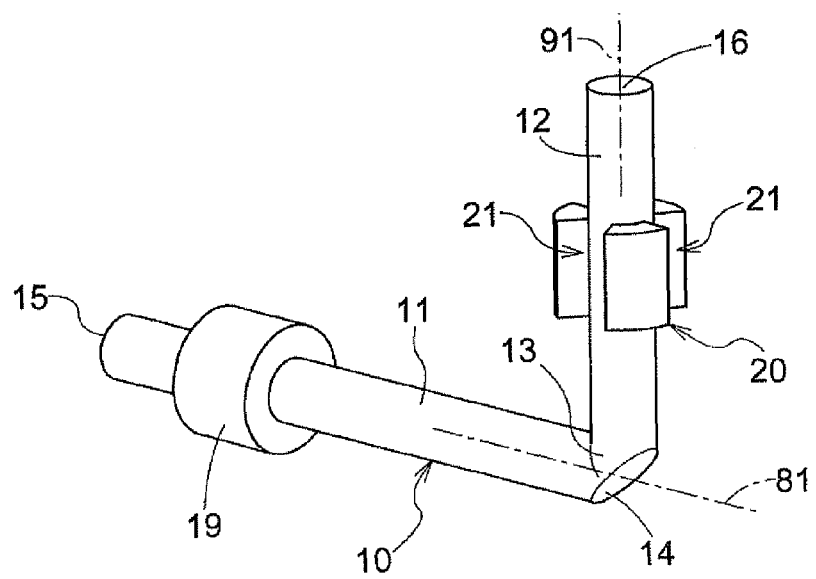
Figure 7:
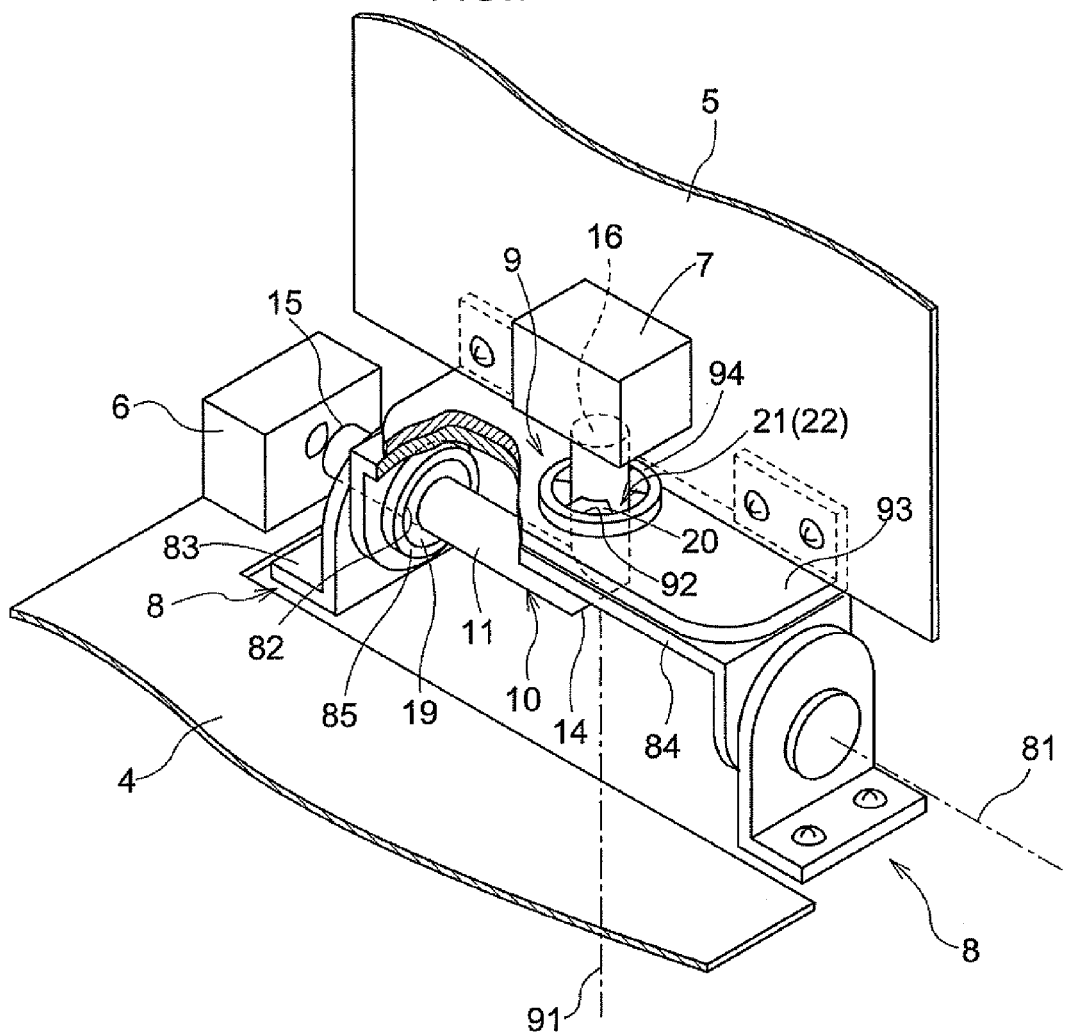

As shown in FIG. 6, an optical guide path member 10 according to this embodiment has a diameter which is smaller than the diameters of the first through hole 82 of the first hinge ring 85 and the second through hole 92 of the third hinge ring 94. And, a cylindrical flange portion 19 having the same diameter as the first through hole 92 is formed on an the outer peripheral face of the first portion 11 of the optical guide path member 10. Further, a cylindrical (split-cylindrical) flange portion 20 having the same diameter as the second through hole 92 is formed on the outer peripheral face of the second portion 12 of the optical guide path member 10. Then, as the flange portion 19 is inserted into the first through hole 82 and fixed therein and the flange portion 20 is inserted into the second through hole 92 and fixed therein, the optical guide path member 10 is fixed in position. The first hinge ring 85 corresponds to an "attaching portion" provided in the first hinge portion, the third hinge ring 94 corresponds to an "attaching portion" provided in the second hinge portion 9, and the flange portions 19, 20 correspond to "an inserted portion", respectively.

The flange portion 20 on the side of the second portion 12 includes recesses 21, thus forming gaps 22 between these recesses 21 and the inner peripheral face of the second through hole 92. Each one of these gaps 22 can act as a cable layout path for an elongate cable between the first casing 2 and the second casing 3. Therefore, there occurs no intertwining between the cable and the optical guide path member 10, providing no interference to the relative pivotal movements between the two casings 2, 3. Further, as the cable can be laid out adjacent the pivotal axis, twisting or tensioning of the cable hardly occurs when the casings are displaced relative to each other. Such gaps as above can be formed not only in the flange portion 20, but also in the flange portion 19.

Fourth Embodiment

Figure 8:
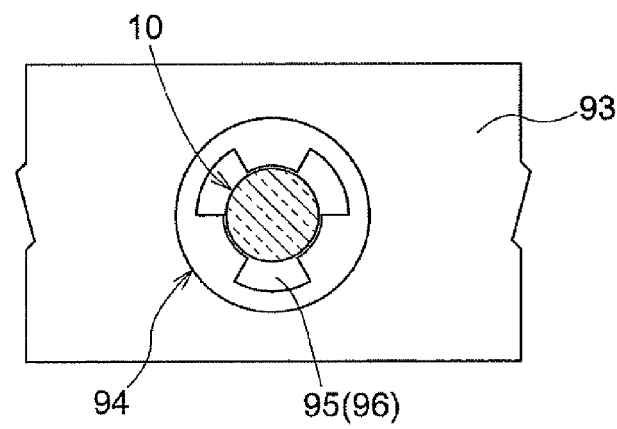

As shown in FIG. 8, recesses 95 can be provided in the third hinge ring 94 to provide gaps 96. The first hinge ring 85 too can include such recesses for providing gaps which act as cable layout paths. Moreover, both the third hinge ring 94 and the first hinge ring 85 can define such gaps. In this case, the flange portions 19, 20 can be omitted.

Fifth Embodiment

Figure 9:
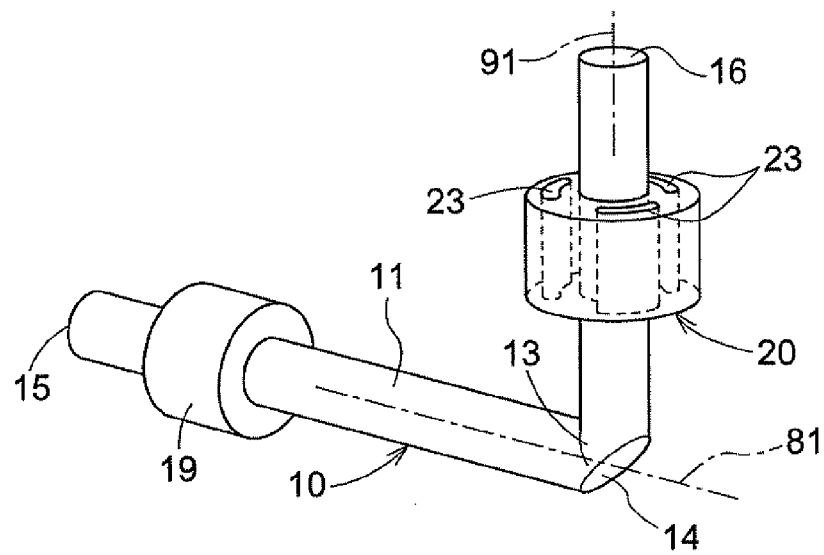
Figure 10:
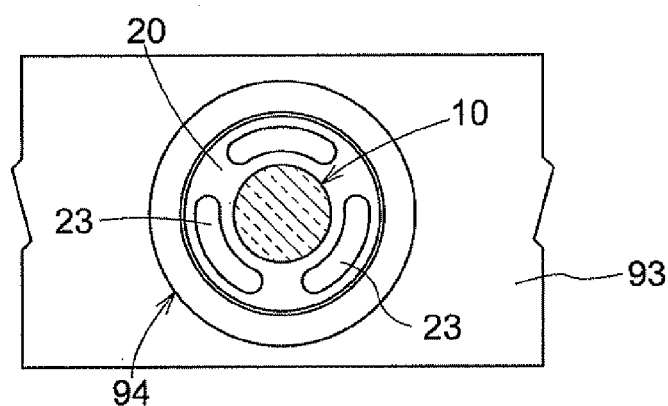

As shown in FIG. 9 and FIG. 10, the flange portion 20 can define through holes 23 along the second axis 91. These through holes 23 can be used as cable layout paths. And, such through holes can be defined not only in the flange portion 20, but also in the other flange portion 19.

Sixth Embodiment

Figure 11:
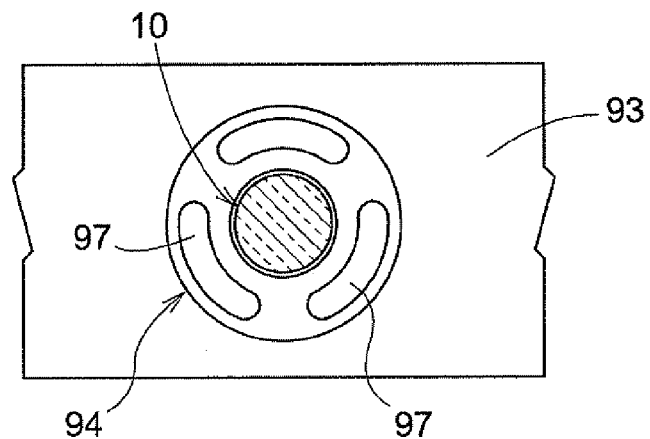

As shown in FIG. 11, the third hinge ring 94 can define through holes 97 along the second axis 91. These through holes 97 can be used as cable layout paths. And, such through holes can be defined not only in the third hinge ring 94, but also in the first hinge ring 85. In this case too, the flange portions 19, 20 can be omitted.

The invention claimed is:

1. An optical transmission hinge apparatus comprising:
   a first casing including a first optical device;
   a second casing including a second optical device;
   a first hinge portion for pivotally interconnecting said first casing and said second casing about a first axis, said first hinge portion including a leg portion fixed to said first casing and a first pivot plate supported to said leg portion to be pivotable about a first axis;

a second hinge portion for interconnecting said first casing and said second casing to be pivotable about a second axis which extends normal to said first axis, said second hinge portion including a second pivot plate fixed to said first pivot plate and said second casing, said second hinge portion supporting said first pivot plate to be pivotable about said second axis; and an optical guide path member for interconnecting said first optical device and said second optical device to enable optical transmission therebetween, wherein said optical guide path member includes a bent portion, a straight first portion formed on one side of said bent portion and a second straight portion formed on the other side of said bent portion, wherein said first pivot plate includes a first attaching portion configured to allow insertion and holding therein of said first portion along said first axis and a second attaching portion configured to allow insertion and holding therein of said second portion along said second axis;

wherein a first terminal end of said optical guide path member on a side of said first portion is placed in opposition to said first optical device to be rotatable relative thereto and a second terminal end of said optical guide path member on a side of said second portion is placed in opposition to said second optical device to be rotatable relative thereto; and wherein said optical guide path member and at least one of said first attaching portion and second attaching portion together define a gap therebetween acting as a cable layout path extending along either said first axis or said second axis, separately from a clearance needed for insertion of said optical guide path member.

2. The optical transmission hinge apparatus according to claim 1, wherein said bent portion includes a reflecting portion configured to switch over the optical path between said first optical device and said second optical device.

3. An optical transmission hinge apparatus comprising:
a first casing including a first optical device;
a second casing including a second optical device;
a first hinge portion for pivotally interconnecting said first casing and said second casing about a first axis, said first hinge portion including a leg portion fixed to said first casing and a first pivot plate supported to said leg portion to be pivotable about a first axis;

a second hinge portion for interconnecting said first casing and said second casing to be pivotable about a second axis which extends normal to said first axis, said second hinge portion including a second pivot plate fixed to said first pivot plate and said second casing, said second hinge portion supporting said first pivot plate to be pivotable about said second axis; and an optical guide path member for interconnecting said first optical device and said second optical device to enable optical transmission therebetween, wherein said optical guide path member includes a bent portion, a straight first portion formed on one side of said bent portion and a second straight portion formed on the other side of said bent portion, wherein said first pivot plate includes a first attaching portion configured to allow insertion and holding therein of said first portion along said first axis and a second attaching portion configured to allow insertion and holding therein of said second portion along said second axis;

wherein a first terminal end of said optical guide path member on a side of said first portion is placed in opposition to said first optical device to be rotatable relative thereto and a second terminal end of said optical glide path member on a side of said second portion is place in opposition to said second optical device to be rotatable relative thereto; and wherein at least one of said optical guide path member, said first attaching portion, and said second attaching portion defines a through hole acting as a cable layout path extending along either said first axis or said second axis and configured for insertion and holding therein of said optical guide path member.

4. The optical transmission hinge apparatus according to claim 3, wherein said bent portion includes a reflecting portion configured to switch over the optical path between said first optical device and said second optical device.

* * * * *

UNITED STATES PATENT AND TRADEMARK OFFICE
CERTIFICATE OF CORRECTION

PATENT NO.           : 7,933,477 B2                                           Page 1 of 1
APPLICATION NO.      : 12/400179
DATED                : April 26, 2011
INVENTOR(S)          : Yasuhiro Shigeno et al.

It is certified that error appears in the above-identified patent and that said Letters Patent is hereby corrected as shown below:

<u>Claim 3</u>, col. 10, line 26, "optical glide" should read -- optical guide --

Signed and Sealed this
Eleventh Day of October, 2011

David J. Kappos
*Director of the United States Patent and Trademark Office*